United States Patent [19]

Chung et al.

[11] Patent Number: 5,314,594
[45] Date of Patent: May 24, 1994

[54] CATHODIC ELECTRODEPOSITION COATINGS HAVING AN ADDITIVE FOR IMPROVED THROWING POWER

[75] Inventors: Ding Y. Chung, Rochester Hills; Kenneth S. Kirshenbaum, West Bloomfield, both of Mich.

[73] Assignee: E. I. Du Pont de Nemours and Company, Wilmington, Del.

[21] Appl. No.: 988,436

[22] Filed: Dec. 9, 1992

[51] Int. Cl.⁵ .............................................. C25D 13/10
[52] U.S. Cl. .............................. 204/181.4; 204/181.7; 523/453; 523/415; 524/901
[58] Field of Search ................ 204/181.4, 181.7; 523/453, 415; 524/901

[56] References Cited

U.S. PATENT DOCUMENTS

| | | | |
|---|---|---|---|
| 3,922,253 | 11/1975 | Jerabek et al. | 260/77.5 TB |
| 4,137,140 | 1/1979 | Belanger | 204/181 C |
| 4,294,741 | 10/1981 | Bosso | 204/181.7 |
| 4,419,467 | 12/1983 | Wismer et al. | 523/414 |
| 4,468,307 | 8/1984 | Wismer et al. | 204/181 C |
| 4,983,454 | 1/1991 | Hiraki et al. | 204/181.7 |
| 5,145,893 | 9/1992 | Galbo et al. | 524/102 |
| 5,205,916 | 4/1993 | Chung et al. | 204/181.7 |

*Primary Examiner*—John Niebling
*Assistant Examiner*— Mayekar
*Attorney, Agent, or Firm*—Hilmar L. Fricke

[57] ABSTRACT

An improved aqueous electrocoating composition having a binder of an epoxy-amine adduct and a blocked polyisocyanate crosslinking agent; wherein the improvement is the use of an effective amount of an additive of an alkyl thioester or a polymeric product of an epoxy resin, polyalkylene glycol and a sugar to form an electrocoating composition that has significantly improved throwing power and provides a coating that has the necessary properties such as chip, solvent and corrosion resistance.

11 Claims, No Drawings

CATHODIC ELECTRODEPOSITION COATINGS HAVING AN ADDITIVE FOR IMPROVED THROWING POWER

BACKGROUND OF THE INVENTION

This invention is directed to a cathodic electrocoating composition and in particular to a composition that contains an additive to improve throwing power.

The coating of electrically conductive substrates by an electrodeposition process (also called an electrocoating process) is a well known and important industrial process. Electrodeposition of primers to automotive substrates is widely used in the automotive industry. In this process, a conductive article, such as an autobody or an auto part, is immersed in a bath of a coating composition containing an aqueous emulsion of film forming polymer and acts as an electrode in the electrodeposition process. An electric current is passed between the article and a counterelectrode in electrical contact with the aqueous emulsion until a desired thickness of coating is deposited on the article. In a cathodic electrocoating process, the article to be coated is the cathode and the counter-electrode is the anode.

Resin compositions used in the bath of a typical cathodic electrodeposition process also are well known in the art. These resins typically are made from a polyepoxide which has been chain extended and then an adduct is formed to include amine groups in the resin. Amine groups typically are introduced through reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrodeposition bath. The thickness of the coatings that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at a sufficient temperature to produce a crosslinked finish on the article.

Cathodic electrocoating compositions and resin compositions, coating baths, and cathodic electrodeposition processes are disclosed in Jerabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979 and Wismer et al U.S. Pat. No. 4,468,307 issued Aug. 25, 1984.

Throwing power of electrocoating compositions continues to be a problem. Throwing power is the degree to which an electrodeposited film penetrates and coats the surfaces of recessed interior areas of an automobile or truck body. Electrodeposition of coatings follows the force lines of the electrical field that exists between the cathode and anode. These force lines diminish as they penetrate into recessed areas and cease to exist when the recessed area is too deep and a coating will not be deposited into such areas.

As automobile and truck body designs change, there is an increased need for electrocoating compositions with increased throwing power that will penetrate into recessed areas. The improved composition of this invention has increased throwing power that will prolong the life of electrocoated auto or truck bodies by improving protection in remote areas from environmentally caused corrosion.

SUMMARY OF THE INVENTION

An improved aqueous electrocoating composition having a binder of an epoxy-amine adduct and a blocked polyisocyanate crosslinking agent; wherein the improvement is the use of an effective amount of an additive of an alkyl thioester or a polymeric product of an epoxy resin, polyalkylene glycol and a sugar to provide an electrocoating composition having improved throwing power.

DETAILED DESCRIPTION OF THE INVENTION

The use of the additive in a cathodic electrocoating composition increases the throwing power of the composition. The throwing power is inherent for an electrocoating composition and is usually affected by changes in the binder, crosslinking agent, amount of pigment or solvent. It is surprising and unexpected that the additive used in this invention can increase the throwing power of an electrocoating composition without adversely affecting other properties of the composition.

The additive is used in an amount of about 0.25–5% by weight, based on the weight of non-volatile components in the electrocoating composition. Preferably, the additive is used in an amount of 0.5–2.5% and more preferably 0.75–1.5% by weight, based on the weight of non-volatile components in the composition.

The non-ionic polyhydroxylic polymeric additive is a reaction product of an epoxy resin of diglycidyl ether and Bisphenol A, a polyethylene glycol and a sugar. Typical epoxy resins of diglycidyl ether and Bisphenol A that can be used include Epon® 828, Epon® 1001 and Epon® 1002F, available from Shell Chemical Company, having epoxy equivalent weights of 188, 500 and 650, respectively. This component of the additive comprises about 15 to 95% of the total weight of the polymeric additive.

The polyethylene glycol component of the additive can have a weight average molecular weight from about 100 to 2000. Typical examples of such polymers are "PEG" 200, "PEG" 900 AND "PEG" 1450 with weight average molecular weights of 200, 900 and 1450, respectively, available from Union Carbide under the CARBOWAX® trademark. This component comprises about 1 to 75% by weight of the additive.

The sugar component of the additive should have at least four hydroxyls. Typical examples are dextrose, sorbitol, manitol and glucose, which are commonly available. The sugar component of the additive comprises about 1 to 40% by weight of the additive.

The non-ionic polypolyhydroxylic additive is formed by reacting the epoxy resin, polyethylene glycol and the sugar in the presence of an amine catalyst for about 1–10 hours at a temperature of about 100°–175° C.

The alkylthioester additive is a hydrocarbon containing one to two sulfur functionalities and one to two ester groups. Typical alkylthioesters are dilaurylthiodipropionate, which is commercially available as Cyanox® LTDP from American Cyanamid, and distearylthiopropionate, which is commercially available as Cyanox ® STDP from American Cyanamid. Another useful alkylthioester is dioctylthiodipropionate.

The additive can be incorporated into the electrocoating composition in either the pigment dispersion or the aqueous emulsion of an epoxy amine adduct blended with the crosslinking agent.

Most principal emulsions used in the electrocoating composition which are the binder of the composition comprise an aqueous emulsion of an epoxy amine adduct blended with a cross-linking agent which has been neutralized with an acid to form a water soluble product. Generally, a metal catalyst is added to a blend of the epoxy amine adduct and crosslinking agent.

Useful epoxy amine adducts are generally disclosed in U.S. Pat. No. 4,419,467 which is incorporated herein by reference.

Preferred crosslinking agents are also well known in the prior art and are aliphatic, cyclosliphatic and aromatic isocyanates such as hexamethylene diisocyanate, cyclohexamethylene diisocyanate, toluene diisocyanate, methylene diphenyl diisocyanate and the like. These isocyanates are prereacted with a blocking agent such as oximes, alcohols, and caprolactams which block the isocyanate functionality, i.e., the crosslinking functionality. Upon heating the blocking agents separate, thereby providing a reactive isocyanate group and crosslinking occurs. Isocyanate crosslinkers and blocking agents are well known in the prior art and also are disclosed in the aforementioned U.S. Pat. No. 4,419,467.

The cathodic binder resin of the epoxy adduct and the blocked isocyanate are the principal resinous ingredients in the electrocoating composition and are usually present in amounts of about 40 to 60 percent by weight of epoxy amine adduct and 60 to 40 percent by weight of blocked isocyanate.

Besides the binder components described above, the electrocoating composition usually contains pigment which is incorporated into the composition in the form of a pigment paste. The pigment paste is prepared by grinding or dispersing a pigment into a grinding vehicle, and optional ingredients such as wetting agents, surfactants, and defoamers are added. The additive can be added to the paste. Any of the pigment grinding vehicles that are well known in the art can be used. After grinding, the particle size of the pigment should be as small as practical, generally, the particle size is about 6-8 using a Hegman grinding gauge.

Pigments that are used include titanium dioxide, carbon black, iron oxide, clay and the like. Pigments with high surface areas and oil absorbencies should be used judiciously because these can have an undesirable affect on coalescence and flow of the electrodeposited coating.

The pigment to binder weight ratio of all the pigments used also is important and should be preferably less than 0.5:1, more preferably less than 0.4:1, and usually about 0.2 to 0.4:1. Higher pigment to binder weight ratios have also been found to adversely affect coalescence and flow.

The coating composition of the invention can contain optional ingredients such as wetting agents, surfactants, defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0.1 to 2.0 percent by weight of binder solids of the composition.

Optionally, plasticizers can be used to promote flow. Examples of useful plasticizers are high boiling water immiscible materials such as ethylene or propylene oxide adducts of nonyl phenols of bisphenol A. Plasticizers are usually used at levels of about 0.1 to 15 percent by weight binder solids.

The electrocoating composition of this invention is an aqueous dispersion. The term "dispersion" as used within the context of this invention is believed to be a two-phase translucent or opaque aqueous resinous binder system in which the binder is in the dispersed phase and water the continuous phase. The average particle size diameter of the binder phase is about 0.1 to 10 microns, preferably, less than 5 microns. The concentration of the binder in the aqueous medium in general is not critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

Besides water, the aqueous medium generally contains a coalescing solvent or solvents. Useful coalescing solvents include hydrocarbons, alcohols, polyols and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0.1 to 15 percent by weight, preferably about 0.5 to 5 percent by weight based on total weight of the binder solids.

The following example illustrates the invention. All parts and percentages are on a weight basis unless otherwise indicated.

EXAMPLES

Preparation of Epoxy Amine Adduct

The following ingredients were charged into a suitable reaction vessel: 1478 parts Epon 828 ® (epoxy resin of diglycidyl ether of Bisphenol A from Shell Chemical Company having an epoxy equivalent weight of 188); 533 parts ethoxylated Bisphenol A having a hydroxy equivalent weight of 247 (Synfac ® 8009 from Milliken Company); 421 parts of Bisphenol A; and 121 parts xylene. The resulting reaction mixture was heated to 160° C. under a nitrogen blanket and held at this temperature for 1 hour. 5.1 parts dimethyl benzyl amine were added and the mixture was held at 147° C. until a 1150 epoxy equivalent weight was obtained. The reaction mixture was cooled to 98° C. and 168 parts of diketimine (reaction product of diethylenetriamine and methyl isobutyl ketone at 72.7% solids) and 143 parts of methyl ethanol amine were added. The resulting mixture was held at 120° C. for 1 hour and solution had a non-volatile content of 75%.

| Preparation of Quaternizing Agent | Parts by Weight |
|---|---|
| Blocked Isocyanate Solution (2-Ethylhexanol half capped toluene diisocyanate is methyl isobutyl ketone) | 320.0 |
| Dimethylethanol amine | 87.2 |
| Aqueous lactic acid solution | 117.6 |

-continued

| Preparation of Quaternizing Agent | Parts by Weight |
|---|---|
| 2-Butoxyethanol | 39.2 |
| Total | 564.0 |

The quaternizing agent was prepared by adding dimethylethanol amine to the blocked isocyanate solution in a suitable reaction vessel at ambient temperature. An exothermic reaction occurs and the reaction mixture was stirred for one hour and held at a temperature of 80° C. Lactic acid solution was added followed by the addition of 2-butoxyethanol. The reaction mixture was stirred for an additional hour at 65° C. to form the quaternizing agent.

| Preparation of Pigment Grinding Vehicle | Parts by Weight |
|---|---|
| Epon ® 829 (epoxy resin of diglycidyl ether of Bisphenol A from Shell Chemical Company having an epoxy equivalent weight of 192–203) | 710.0 |
| Bisphenol A | 289.6 |
| Blocked isocyanate solution (described above) | 406.0 |
| Quaternizing Agent (prepared above) | 496.3 |
| Deionized water | 71.2 |
| 2-Butoxyethanol | 1095.2 |
| Total | 3068.3 |

Epon ® 829 and Bisphenol A were charged under a nitrogen atmosphere to a suitable reaction vessel and heated to 150°–160° C. to initiate an exothermic reaction. The reaction was allowed to continue for one hour. The reaction mixture was cooled to 120° C. and the blocked isocyanate solution was added. The temperature of the reaction mixture was held at 110°–120° C. for one hour, followed by the addition of 2-butoxyethanol. The reaction mixture then was cooled to 85°–90° C., homogenized and then the deionized water was added followed by the addition of the Quaternizing agent. The reaction mixture was held at about 80°–85° C. until an acid value of about 1 was obtained. The resulting mixture had a solids contents of about 58%.

| Preparation of Polyhydroxylic Polymeric Additive | Parts by Weight |
|---|---|
| Portion 1 | |
| Epon ® 828 (epoxy resin of diglycidyl ether of Bisphenol A from Shell Chemical Company having an epoxy equivalent weight of about 188) | 376.0 |
| Sorbitol | 182.0 |
| "PEG" 200 (polyethylene glycol having a weight average molecular weight of about 200) | 200 |
| Portion 2 | |
| Dimethyl benzyl amine | 1.0 |
| Portion 3 | |
| Methyl isobutyl ketone | 189.0 |
| Total | 948.0 |

Portion 1 was charged into a reaction vessel and blanketed with nitrogen and heated to about 150° C. and then portion 2 was added. The reaction was continued at the above temperature for about 6 hours (or until all of the epoxy resin has been reacted) and then cooled to about 25° C. and portion 3 was added. The mixture was then heated to about 125° C. to obtain a solution and then allowed to cool to an ambient temperature.

| Preparation of Pigment Pastes | Parts by Weight |
|---|---|
| Paste A (without additive) Control | |
| Pigment Grinding Vehicle (prepared above) | 197.69 |
| Deionized water | 404.27 |
| Carbon black pigment | 11.18 |
| Aluminum silicate pigment | 52.17 |
| Lead pigment | 22.36 |
| Dibutyl tin oxide | 29.81 |
| Titanium dioxide pigment | 257.12 |
| Total | 974.60 |
| Paste B (with additive) | |
| Pigment Grinding Vehicle (prepared above) | 197.69 |
| Deionized water | 404.27 |
| Carbon black pigment | 11.18 |
| Aluminum silicate pigment | 52.17 |
| Lead pigment | 22.36 |
| Dibutyl tin oxide | 29.81 |
| Titanium dioxide pigment | 223.58 |
| Additive (prepared above) | 33.54 |
| Total | 974.60 |
| Preparation of Emulsion | |
| Epoxy Amine Adduct (prepared above) | 1255.0 |
| Capped Isocyanate Crosslinker[1] | 737.0 |
| Surfactant[2] | 32.7 |
| Deionized Water | 3666.0 |
| Lactic Acid | 67.0 |
| Total | 5757.7 |

[1]Polyurethane crosslinker formed from half-capping toluene diisocyanate (80/20 2,4/2,6 isomer mixture) with 2-hexyloxy ethanol and reacting this product with tri methylol propane in a 3:1 molar ratio. The crosslinker is present as a 70 percent solids solution in methyl isobutyl ketone.
[2]Surfactant is a mixture of 120 parts "Amine C" from Ciba-Geigy, 120 parts acetylenic alcohol, commercially available as "Surfynol 104", 120 parts of 2-butoxyethanol and 221 parts by weight of deionized water and 19 parts glacial acetic acid.

butoxyethanol and 221 parts by weight of deionized water and 19 parts glacial acetic acid.

The epoxy amine adduct, crosslinker, lactic acid, and surfactant were thoroughly mixed and then deionized water was added under agitation. The emulsion was stable.

| Preparation of an Electrocoating Bath | Parts by Weight |
|---|---|
| Emulsion (prepared above) | 1421 |
| Pigment Paste (A or B) | 352 |
| Deionized Water | 1427 |
| Dowanol PPH solvent | 30 |
| Total | 3230 |

The two electrocoating baths were prepared by blending the above ingredients together and kept under constant stirring. Bath A is the control and Bath B contained the additive. After one night of open air aging, the voltage required to obtain 0.85+/−0.03 mil film build at 29° C. on zinc phosphated cold-rolled steel panels was determined for each bath. The voltage for both paints was 200 V. The throwing power of the paints was then determined at 200 V according to Ford Laboratory Test Method MJ BI 20-2C.

As per the procedure, the height of the coating deposited on the inside of a box formed by the 18"×4" zinc phosphate coated cold rolled steel panels was measured. This is the Total Throw. The distance up the panel from the bottom to where the film thickness was 0.5 mil was also measured. This is called the Wedge. Both of these measure aspects of throwpower. A higher value for Total Throw indicates that the electrodeposited film covers more area in recessed areas. A higher value for Wedge indicates that more film is deposited at any given point in a recessed area. Improvements in either Total Throw or Wedge are desirable.

| Bath | Total Throw | Wedge |
|---|---|---|
| (A) Control | 12.0" | 6.2" |
| (B) Additive | 12.6" | 6.9" |

The above data shows the Bath B which contained the additive had improved both Total Throw and Wedge as compared to Bath A, which did not contain the additive.

Each of the panels coated from Baths A and B were baked at 182° C. for 14 minutes in an electric oven and had good appearance and solvent resistance. An additional set of panels from the two baths had acceptable corrosion resistance and chip resistance.

EXAMPLE 2

Pigment pastes C and D were prepared as follows:

|  | Parts by Weight |
|---|---|
| Paste C (without additive) Control | |
| Pigment Grinding Vehicle (prepared in Example 1) | 197.69 |
| Deionized water | 404.27 |
| Carbon black pigment | 11.18 |
| Aluminum silicate pigment | 52.17 |
| Lead pigment | 22.36 |
| Dibutyl tin oxide | 29.81 |
| Titanium dioxide pigment | 257.12 |
| Total | 974.60 |
| Paste D (with additive) | |
| Pigment Grinding Vehicle (prepared above) | 197.69 |
| Deionized water | 404.27 |
| Carbon black pigment | 11.18 |
| Aluminum silicate pigment | 52.17 |
| Lead pigment | 22.36 |
| Dibutyl tin oxide | 29.81 |
| Titanium dioxide pigment | 223.58 |
| Additive (distearyl thiopropionate) | 33.54 |
| Total | 974.60 |
| Preparation of the Emulsion | |
| Epoxy Amine Adduct (prepared in Example 1) | 1255 |
| Capped Isocyanate Crosslinker[1] | 737 |
| Deionized Water | 3666 |
| Lactic Acid | 67 |
| Total | 5725 |

[1]Polyurethane crosslinker formed from methylene diisocyanate available from Dow Chemical Company as Papi 2027 blocked with glycol-ether DB available from Ashland Chemical. The crosslinker is present as a 77 percent solids solution in methyl isobutyl ketone.

The epoxy amine adduct crosslinker and lactic acid were thoroughly mixed and then deionized water added under agitation. The emulsions were stable.

| Preparation of an Electrocoating Bath | Parts by Weight |
|---|---|
| Emulsion (prepared above) | 1421 |
| Pigment Paste (C or D) | 352 |
| Deionized Water | 1427 |
| Total | 3200 |

The two electrocoating baths were prepared by blending the above ingredients together and kept under constant stirring. Bath C is the control and Bath D contained the additive. After one night of open air aging, the voltage required to obtain 0.85+/−0.03 mil film build at 30° C. and 1.33 mil +/−0.03 mil film build at 32° C. on zinc phosphated cold-rolled steel panels was then determined for each paint.

Following the procedure in Example 1, the Total Throw and the Wedge were measured and are shown below:

| Bath | T° C. | Total Throw | Wedge |
|---|---|---|---|
| C (Control) | 30 | 9.1" | 3.6" |
| D (Additive) | 30 | 10.0" | 4.1" |
| C (Control) | 32 | 11.4" | 6.8" |
| D (Additive) | 32 | 12.3" | 7.1" |

The above data shows the Bath D which contained the additive had improved both Total Throw and Wedge as compared to Bath C, which did not contain the additive.

Each of the panels coated from Baths C and D were baked at 182° C. for 14 minutes in an electric oven and had good appearance and solvent resistance. An additional set of panels from the two baths had acceptable corrosion resistance and chip resistance.

We claim:

1. An improved cathodic electrocoating composition comprising an aqueous carrier having dispersed therein a film forming binder comprising an epoxy-amine adduct and a blocked polyisocyanate crosslinking agent; and the improvement consisting essentially of the use of an effective amount of an additive of an alkyl thioester.

2. The electrocoating composition of claim 1 in which the alkyl thioester contains 1–2 sulfur functionalities and 1–2 ester groups.

3. The electrocoating composition of claim 2 in which the alkyl thioester is an alkyl thiodipropionate.

4. The electrocoating composition of claim 3 in which the alkyl thioester is selected from the group consisting of dilauryl thiodipropionate or distearylthiodipropionate.

5. An improved cathodic electrocoating composition comprising an aqueous carrier having dispersed therein a film forming binder comprising an epoxy-amine adduct and a blocked polyisocyanate and the improvement comprises use of an additive of a polymeric product consisting essentially of an epoxy resin, polyethylene glycol and a sugar.

6. The electrocoating composition of claim 5 in which the epoxy resin of the polymeric product is of a diglycidyl ether and Bisphenol A.

7. The electrocoating composition of claim 5 in which the polyethylene-glycol has a weight average molecular weight of 100–2000.

8. The electrocoating composition of claim 5 in which the sugar is selected from the group consisting of dextrose, sorbitol, mannitol, or glucose.

9. The electrocoating composition of claim 5 in which the polymeric product consists essentially of an epoxy resin of diglycidyl ether and Bisphenol A, polyethylene glycol having a weight average molecular weight of about 100–2000 and sorbitol.

10. An improved method of preparing a cathodic electrocoating composition containing film forming binder comprising the following steps in any workable order:

(a) preparing an epoxy-amine adduct;

(b) preparing a blocked polyisocyanate crosslinking agent;

(c) blending the epoxy amine adduct with the blocked polyisocyanate crosslinking agent;

(d) neutralizing the epoxy-amine adduct with an organic acid to form an emulsion;
(e) blending the emulsion with a pigment paste; and
the improvement comprises use of an effective amount of an additive of polymeric product of an epoxy resin, polyalkylene glycol and sugar to provide the composition having improved throwing power.

11. An improved method of preparing a cathodic electrocoating composition containing film forming binder comprising the following steps in any workable order:
    (a) preparing an epoxy-amine adduct;
    (b) preparing a blocked polyisocyanate crosslinking agent;
    (c) blending the epoxy amine adduct with the blocked polyisocyanate crosslinking agent;
    (d) neutralizing the epoxy-amine adduct with an organic acid to form an emulsion;
    (e) blending the emulsion with a pigment paste; and
    the improvement consisting essentially of use of an effective amount of an additive of an alkyl thioester to provide the composition having improved throwing power.

* * * * *